(12) United States Patent
Qian et al.

(10) Patent No.: US 8,693,890 B2
(45) Date of Patent: Apr. 8, 2014

(54) LOOK-UP TABLE AND DIGITAL TRANSMITTER BASED ARCHITECTURE FOR FIBER NONLINEARITY COMPENSATION

(75) Inventors: Dayou Qian, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 326 days.

(21) Appl. No.: 13/081,693

(22) Filed: Apr. 7, 2011

(65) Prior Publication Data

US 2012/0082468 A1    Apr. 5, 2012

Related U.S. Application Data

(60) Provisional application No. 61/375,327, filed on Aug. 20, 2010, provisional application No. 61/375,329, filed on Aug. 20, 2010.

(51) Int. Cl.
*H04B 10/12* (2011.01)
*H04B 10/04* (2011.01)

(52) U.S. Cl.
USPC ............ 398/188; 398/182; 398/183; 398/147

(58) Field of Classification Search
USPC .......................................... 398/188, 183, 182
See application file for complete search history.

(56) References Cited

U.S. PATENT DOCUMENTS

| | | | | |
|---|---|---|---|---|
| 5,111,322 | A * | 5/1992 | Bergano et al. ................. | 398/74 |
| 7,844,152 | B2 | 11/2010 | Sanders | |
| 2006/0078336 | A1* | 4/2006 | McNicol et al. ............... | 398/147 |
| 2007/0091992 | A1* | 4/2007 | Dowling ....................... | 375/229 |
| 2008/0317157 | A1* | 12/2008 | Ihm et al. ...................... | 375/267 |
| 2009/0252485 | A1 | 10/2009 | Tsuchiya | |

* cited by examiner

*Primary Examiner* — Oommen Jacob
(74) *Attorney, Agent, or Firm* — Joseph Kolodka

(57) ABSTRACT

Systems and methods are disclosed to process an optical signal with a pre-processing module to populate a non-linearity compensation look-up table based on a set of predetermined rules in a non-real-time off-line mode; and a transmitter applying said predetermined rules in real-time to multiple channel input data to generate a real-time symbol pattern, searching the look-up table with the real-time symbol pattern to determine a non-linearity compensation output, and modulating the optical signal with the compensation output.

20 Claims, 8 Drawing Sheets

LOOK-UP TABLE AND DIGITAL TRANSMITTER BASED ARCHITECTURE FOR FIBER NONLINEARITY COMPENSATION

This application claims priority to Provisional Application Ser. Nos. 61/375,327 filed Aug. 20, 2010 and 61/375,329 filed Aug. 20, 2010, the contents of which are incorporated by reference.

BACKGROUND

The present invention relates to fiber non-linearity compensation.

Fiber-based amplifiers offer the ability to amplify ultrafast pulses to energies comparable with conventional bulk solid-state systems with significant practical advantages such as compactness, reduction of complex components, and freedom from misalignment. However, the smaller beam confinement and larger interaction lengths render them vulnerable to nonlinear effects, for single wavelength transmission (compared with WDM case), the dominant of which is self-phase modulation (SPM). Due to the Kerr effect, high optical intensity in a medium (e.g. an optical fiber) causes a nonlinear phase delay which has the same temporal shape as the optical intensity. This can be described as a nonlinear change in the refractive index:

$$\Delta n = n_2 I$$

with the nonlinear index $n_2$ and the optical intensity I. In the context of self-phase modulation, the emphasis is on the temporal dependence of the phase shift, whereas the transverse dependence for some beam profile leads to the phenomenon of self-focusing.

Although the refractive index is a very weak function of signal power, the higher power from optical amplifiers and long transmission distances make it no longer negligible in modern optical communication systems. In fact, phase modulation distortion due to intensity dependent refractive index induces various nonlinear effects, namely, self-phase modulation (SPM) and cross-phase modulation (XPM). (Four-wave mixing (FWM) is another non-linearity distortion but not related to refractive index.)

One nonlinear phase shift originating from the Kerr effect is cross-phase modulation (XPM). While SPM is the effect of a pulse on it own phase, XPM is a nonlinear phase effect due to optical pulses in other channels. Therefore, XPM occurs only in multi-channel systems. In a multi-channel system, the nonlinear phase shift of the signal at the center wavelength $\lambda_i$ is described as, $$\phi_{NL} = \frac{2\pi}{\lambda_i} n_2 z \left[ I_i(t) + 2 \sum_{i \neq j} I_j(t) \right]$$

The first term is responsible for SPM, and the second term is for XPM. The above equation might lead to a speculation that the effect of XPM could be at least twice as significant as that of SPM. However, XPM is more effective when pulses in the other channels are synchronized with the signal of interest. When pulses in each channel travel at different group velocities due to dispersion, the pulses slide past each other while propagating. FIG. 1A illustrates how two isolated pulses in different channels collide with each other. When the faster traveling pulse has completely walked through the slower traveling pulse, the XPM effect becomes weaker. The relative transmission distance for two pulses in different channels to collide with each other is called the walk-off distance.

$$L_w = \frac{T_o}{|v_g^{-1}(\lambda_1) - v_g^{-1}(\lambda_2)|} \approx \frac{T_o}{|D \Delta \lambda|}$$

where $T_o$ is the pulse width, $v_g$ is the group velocity, and $\lambda_1, \lambda_2$ are the center wavelength of the two channels. D is the dispersion coefficient, and $\Delta \lambda = |\lambda_1 - \lambda_2|$.

When dispersion is significant, the walk-off distance is relatively short, and the interaction between the pulses will not be significant, which leads to a reduced effect of XPM. However, the spectrum broadened due to XPM will induce more significant distortion of temporal shape of the pulse when large dispersion is present, which makes the effect of dispersion on XPM complicated.

The dependence of the refractive index on optical intensity causes a nonlinear phase shift while propagating through an optical fiber. The nonlinear phase shift is given by $$\phi_{NL} = \frac{2\pi}{\lambda} n_2 I(t) z$$

where $\lambda$ is the wavelength of the optical wave, and z is the propagation distance.

Since the nonlinear phase shift is dependent on its own pulse shape, it is called self-phase modulation (SPM). When the optical signal is time varying, such as an intensity modulated signal, the time-varying nonlinear phase shift results in a broadened spectrum of the optical signal. If the spectrum broadening is significant, it may cause cross talk between neighboring channels in a dense wavelength division multiplexing (DWDM) system. Even in a single channel system, the broadened spectrum could cause a significant temporal broadening of optical pulses in the presence of chromatic dispersion.

Back-propagation method has been proposed to compensate the fiber non-linearity. The NLSE is an invertible equation. In the absence of noise, the transmitted signal can be exactly recovered by "back-propagating" the received signal through the inverse NLSE given by:

$$\frac{\partial E}{\partial z} = (-\hat{D} - \hat{N}) E$$

This operation is equivalent to passing the received signal through a fictitious fiber having opposite-signed parameters, such as through a receiver side back propagation 10 (FIG. 1A). It is also possible to perform back-propagation at the transmitter side by pre-distorting the signal to invert the channel, and then transmitting the pre-distorted waveform through a transmitter side back propagation 12 (FIG. 1B). In the absence of noise, both schemes are equivalent.

Back-propagation operates directly on the complex-valued field E(z,t). Hence, the technique is universal, as the transmitted signal can have any modulation format or pulse shape, including multicarrier transmission using OFDM.

Some differences between optical system simulation and impairment compensation may occur. In the former, knowing the input to a fiber enables the output be computed to arbitrary precision; whereas in back-propagation, noise prevents exact recovery of the transmitted signal. It has been demonstrated that in the presence of noise, a modified back-propagation equation is effective in compensating nonlinearity:

$$E_{BP}(z,t) = \exp(-h(\hat{D}+\xi\hat{N}))E_{BP}(z+h,t),$$

where $0 \leq \xi \leq 1$ is the fraction of the nonlinearity compensated. For every set of system parameters, there exists an optimum $\xi$ that minimizes the mean square error (MSE) between the transmitted signal $E(0,t)$ and the back-propagation solution $E_{BP}(0, t)$. In zero-dispersion fiber, for example, where back-propagation is equivalent to nonlinear phase rotation, it was shown that $\xi=0.5$ is optimal.

The existence of an optimum $\xi$ can be appreciated by considering that in a typical fiber, the magnitude of the dispersion operator is much greater than the nonlinear operator. Thus, nonlinearity can be viewed as a perturbation to a mostly dispersive channel. The optimum phase to de-rotate at each back-propagation step depends on the accuracy of $E_{BP}(z, t)$ as an estimate of $E(z,t)$. The more accurately the receiver estimates $E(z,t)$, the closer $\xi$ can be set to one, since the nonlinear phase rotation will lead to an output closer to the original signal. Conversely, if $E(z,t)$ is not known accurately, error in amplitude will be converted to random phase rotations by the nonlinear operator $h\xi\hat{N}$, yielding an output that is even further away from the desired signal in Euclidean distance. Hence, the optimum $\xi$ depends on the received SNR as well as any uncompensated distortions that are present during back-propagation.

The receiver shown in FIG. 2 has been proposed for single-carrier transmission system with a coherent optical to electrical conversion system 20. System 20 includes a polarizing beam splitter (PBS) 22 and two 90-degree hybrids coupled to one or more analog to digital converters 24. In system 20, a linear equalizer (FSE) 28 follows a back-propagation module 26. In the absence of nonlinearity, back-propagation function inverts the fiber CD, so PMD is mitigated by the linear equalizer. At realistic transmission distances and symbol rates, PMD has only short duration, so we expect the signal amplitude profile will not be significantly distorted by PMD. Hence, back-propagation with the linear operator can still compensate most of the interactions between CD and nonlinearity. The linear equalizer compensates PMD and any residual linear effects not already compensated by back-propagation. If back-propagation includes PMD, the linear equalizer is reduced to a fixed down-sampler.

The ability of back-propagation to undo nonlinear effects depends on how accurately it can estimate the signal amplitude profile at every point in the fiber. Noise, PMD, and other distortions not estimated by the receiver, but which change the signal intensity profile, thus degrading performance. Since these effects accumulate with distance, the further a signal is back-propagated, the higher the relative error. In receiver-side back-propagation, the signal intensity profile is known accurately at the receiver, but becomes progressively less accurate as it is traced back to the transmitter.

FIG. 3A shows an exemplary arrangement where back-propagation can be done either at the transmitter or receiver side, or can also been split between the transmitter and receiver: transmit-side back-propagation inverts the first half of the channel, while receive-side back-propagation inverts the second half. In FIG. 3A, input data is provided to a back-propagation non-linearity compensation module 40, whose output is provided to an array of digital to analog converters 42. The analog data is provided to an array of electrical-to-optical upconverters 44 and sent to an arrayed waveguide grating (AWG) 46 for transmission to another AWG 48. At AWG 48, the information is converted using optical-to-electrical converters 50 and provided to an array of analog to digital converters 52 whose outputs are provided to a back-propagation non-linearity compensation module 54. Module 54 in turn is connected to an array of linear equalizers 56 driving an array of carrier recovery circuits 58 that generate output data. Since the XPM happens between different channels, multiple channel inputs and outputs need to be processed jointly with the non-linearity compensation module or processor 54 to remove the dispersion caused by XPM during the transmission.

FIG. 3B shows another exemplary arrangement with back-propagation at a transmitter 70 and a receiver 90. At the transmitter 70, data input is provided to an OFDM modulator 72 driving a back-propagation module 74, whose output is applied to a digital to analog converter 76 and provided to an E-O up-converter 78 and transmitted over an optical cable 80 to the receiver 90. At the receiver 90, an O-E down converter 92 receives the data which is provided to an analog to digital converter 94. The digital data is provided to a back-propagation module 96 and optionally to an OFDM demodulator 98. The data is provided to a linear equalizer 100 and then presented to a carrier recovery circuit 102 to generate output data. In FIG. 3B, the back-propagation is split evenly between the transmitter and receiver: transmit-side back-propagation inverts the first half of the channel, while receive-side back-propagation inverts the second half. To account for the change in relative error with distance, the parameter $\xi$ should also vary with distance; a larger $\xi$ is used for the spans closer to the transmitter (and receiver), while a smaller $\xi$ is used for spans further away, where the estimated signal intensity is less reliable.

One challenge for commercial implementation of the non-linearity compensation process is the high computing complexity. If the transmitter or receiver side non-linearity compensation is used, the (back-propagation) non-linearity compensation function has to run in a real-time mode with multiple steps to compensate the linear and non-linear dispersion span by span. Even with the recent efforts in process simplification, the computing complexity of non-linearity compensation is still two orders of magnitude (greater 50 times) greater than the computing complexity of the linear dispersion compensation (1-tap frequency domain equalization) of the same transmission range.

SUMMARY

Systems and methods are disclosed to process an optical signal with a pre-processing module to populate a non-linearity compensation look-up table based on a set of predetermined rules in a non-real-time off-line mode; and a transmitter applying said predetermined rules in real-time to multiple channel input data to generate a real-time symbol pattern, searching the look-up table with the real-time symbol pattern to determine a non-linearity compensation output, and modulating the optical signal with the compensation output.

Implementations of the above aspect can include one or more of the following. The transmitter can be a single polarization transmitter or a PolMux transmitter. An array of digital to analog converters (DACs) can be connected to the transmitter. An array of in-phase/quadrature (I/Q) modulators can be connected to the DACs. A laser and a PM coupler can provide CW light source to the I/Q modulators. The look-up table is generated by determining a plurality of combination of the input symbol sequences from multiple channels and performing non-linearity processing on the symbol pattern and storing the pattern in the look-up table. The non-linearity compensation can be back-propagation techniques or other suitable techniques that are selectable. The input symbol patterns relate to a modulation format and a transmitter architecture and can be geared to single polarization or polarization multiplexing (PolMux) patterns.

DESCRIPTION

Figure 4:
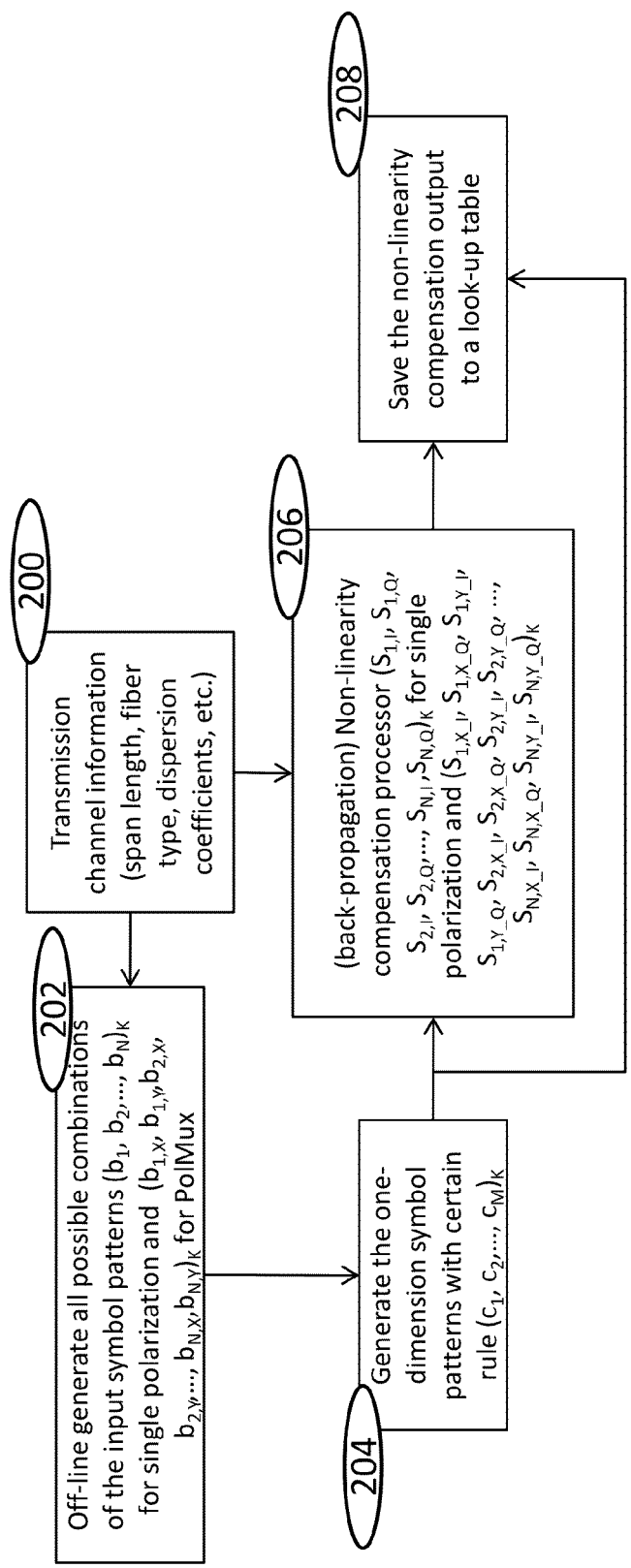
FIG. 4 shows an exemplary process to generate a look-up table for non-linearity compensation output.

FIG. 4 shows an exemplary system to generate the look-up table for the non-linearity compensation output. Transmission line information is collected first (200). Next, the process determines a combination of the input symbol sequences from multiple channels and the non-linearity compensation processor (202). The input symbol patterns may be different for different modulation format and transmitter architecture, for example, OOK or DQPSK, single polarization or Polarization multiplexing (PolMux), among others. The input symbol patterns are re-organized and re-format to generate a one dimension symbol pattern which can be searched within a look-up table (204). Then all possible input symbol patterns determined in 204 are processed with the non-linearity processor (206) and generate multiple different outputs. All these outputs are saved with the look-up table (208) and shown in Table 1. The operations of FIG. 4 can be done off-line to create the look-up table, and once created, the look-up table can be applied in real-time with minimal complexity.

Table 1 below shows one exemplary table look-up architecture:

| Input symbol pattern | Output symbol pattern (single polarization case) | Output symbol pattern (PolMux case) |
|---|---|---|
| $(c_1, c_2, \ldots, c_M)_1$ | $(S_{1,I}, S_{1,Q}, S_{2,I}, S_{2,Q}, \ldots, S_{N,I}, S_{N,Q})_1$ | $(S_{1,X\_I}, S_{1,X\_Q}, S_{1,Y\_I}, S_{1,Y\_Q}, S_{2,X\_I}, S_{2,X\_Q}, S_{2,Y\_I}, S_{2,Y\_Q}, \ldots, S_{N,X\_I}, S_{N,X\_Q}, S_{N,Y\_I}, S_{N,Y\_Q})_1$ |
| $(c_1, c_2, \ldots, c_M)_2$ | $(S_{1,I}, S_{1,Q}, S_{2,I}, S_{2,Q}, \ldots, S_{N,I}, S_{N,Q})_2$ | $(S_{1,X\_I}, S_{1,X\_Q}, S_{1,Y\_I}, S_{1,Y\_Q}, S_{2,X\_I}, S_{2,X\_Q}, S_{2,Y\_I}, S_{2,Y\_Q}, \ldots, S_{N,X\_I}, S_{N,X\_Q}, S_{N,Y\_I}, S_{N,Y\_Q})_2$ |
| ... | ... | ... |
| $(c_1, c_2, \ldots, c_M)_L$ | $(S_{1,I}, S_{1,Q}, S_{2,I}, S_{2,Q}, \ldots, S_{N,I}, S_{N,Q})_L$ | $(S_{1,X\_I}, S_{1,X\_Q}, S_{1,Y\_I}, S_{1,Y\_Q}, S_{2,X\_I}, S_{2,X\_Q}, S_{2,Y\_I}, S_{2,Y\_Q}, \ldots, S_{N,X\_I}, S_{N,X\_Q}, S_{N,Y\_I}, S_{N,Y\_Q})_L$ |

The system of FIG. 4 significantly reduces the implementation complexity by using look-up table search instead of the real-time processing of every signal. The non-linearity compensation feature would certainly improve the transmission performance like the longer span length or total transmission distance. As the system can be implemented at the transmitter side, it can be completely compatible with any receiver solutions. Since the non-linearity compensation processing is done in off-line mode and independent from any specific algorithm, although back-propagation method is used in one embodiment, the system can easily use or update to any other algorithms available for the compensation. When other algorithms are desired, only the look-up table needs to be updated to change to the new algorithm without any hardware changes at the transmitter side.

The symbol stream to the DAC can be sampled twice the Nyquist rule. In one embodiment, the system up-samples data before the look-up table processing. To up-sample the signal, there are many methods, such as interpolation or filter-based method can be used. By repeating the symbol twice the up-sampled signal would give the same performance compared with other methods when the same digital coherent receiver is used. By repeating the symbol twice, the 2-times sampling signal can still be used for look-up table search. For other up-sampling methods, since the symbol values are not binary data, the look-up table search would be difficult and the up-sampling has to be done after the look-up table searching. Although 2-sampling is used, the present inventors contemplate that 1-time sampling signal can be used for the DAC sampling.

Figure 1A:
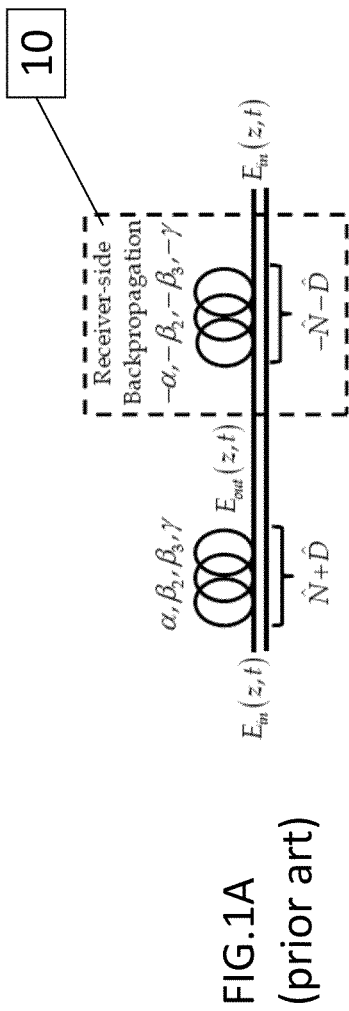
FIGS. 1A-1B show transmitter-side and receiver-side systems with back-propagation.
Figure 1B:
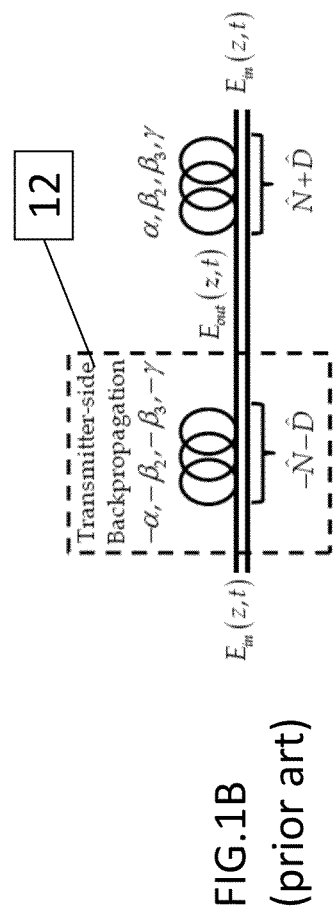
Figure 2:
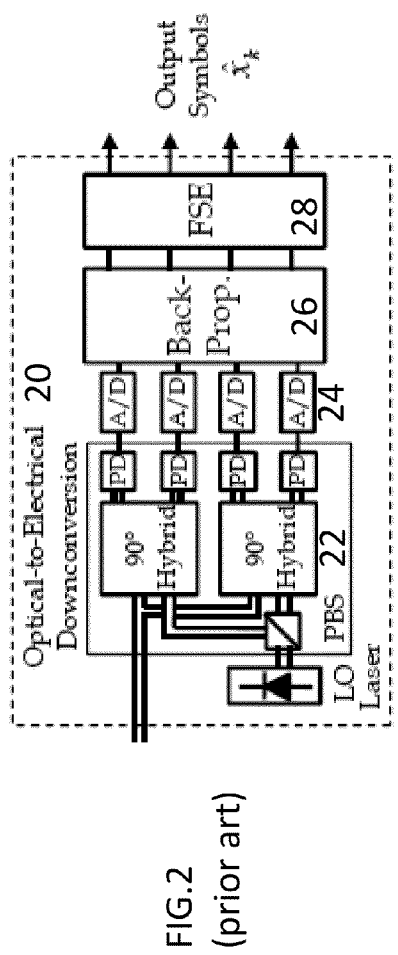
FIG. 2 shows a back-propagation receiver with output linear equalizer to mitigate residual linear distortion for a single-carrier.
Figure 3A:
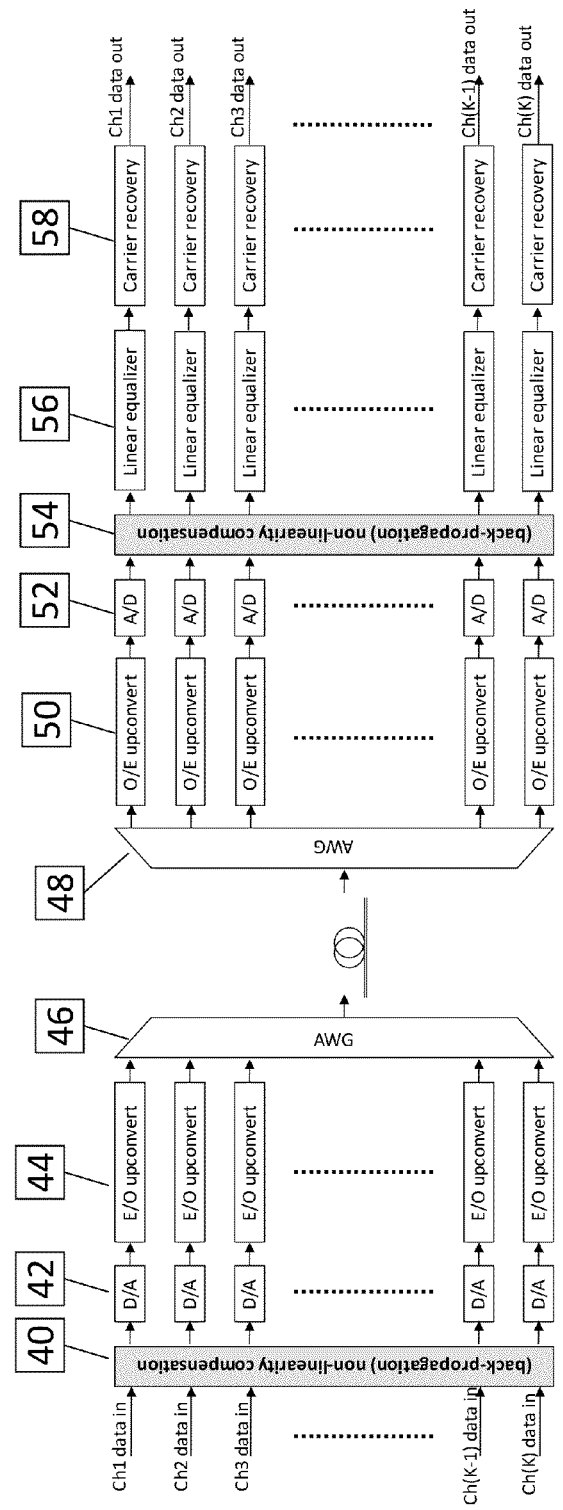
FIG. 3A shows back-propagation implementation for XPM at a transmitter and a receiver.
Figure 3B:
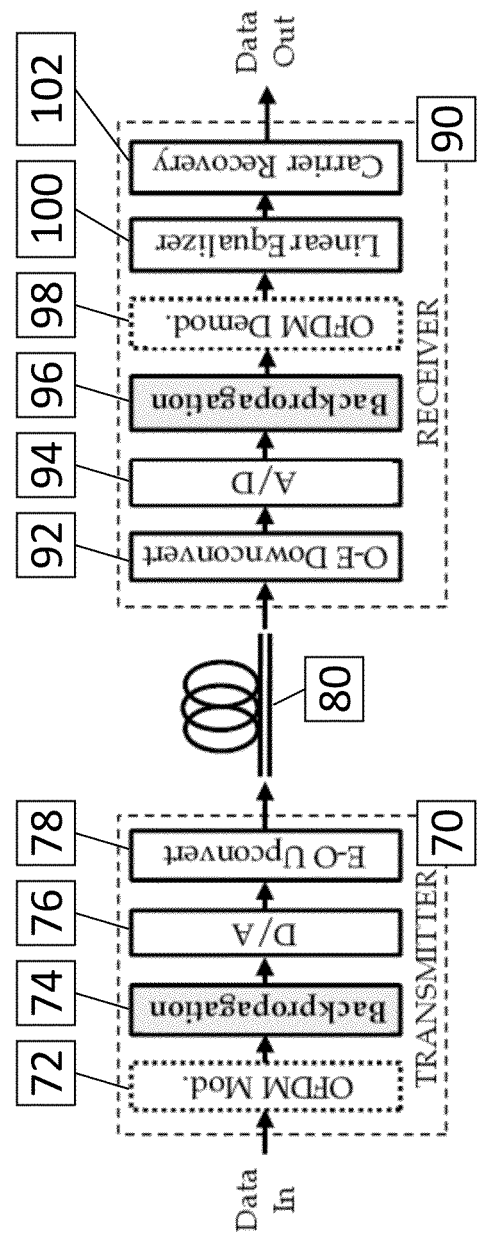
FIG. 3B shows another back-propagation implementation at the transmitter and the receiver.
Figure 5:
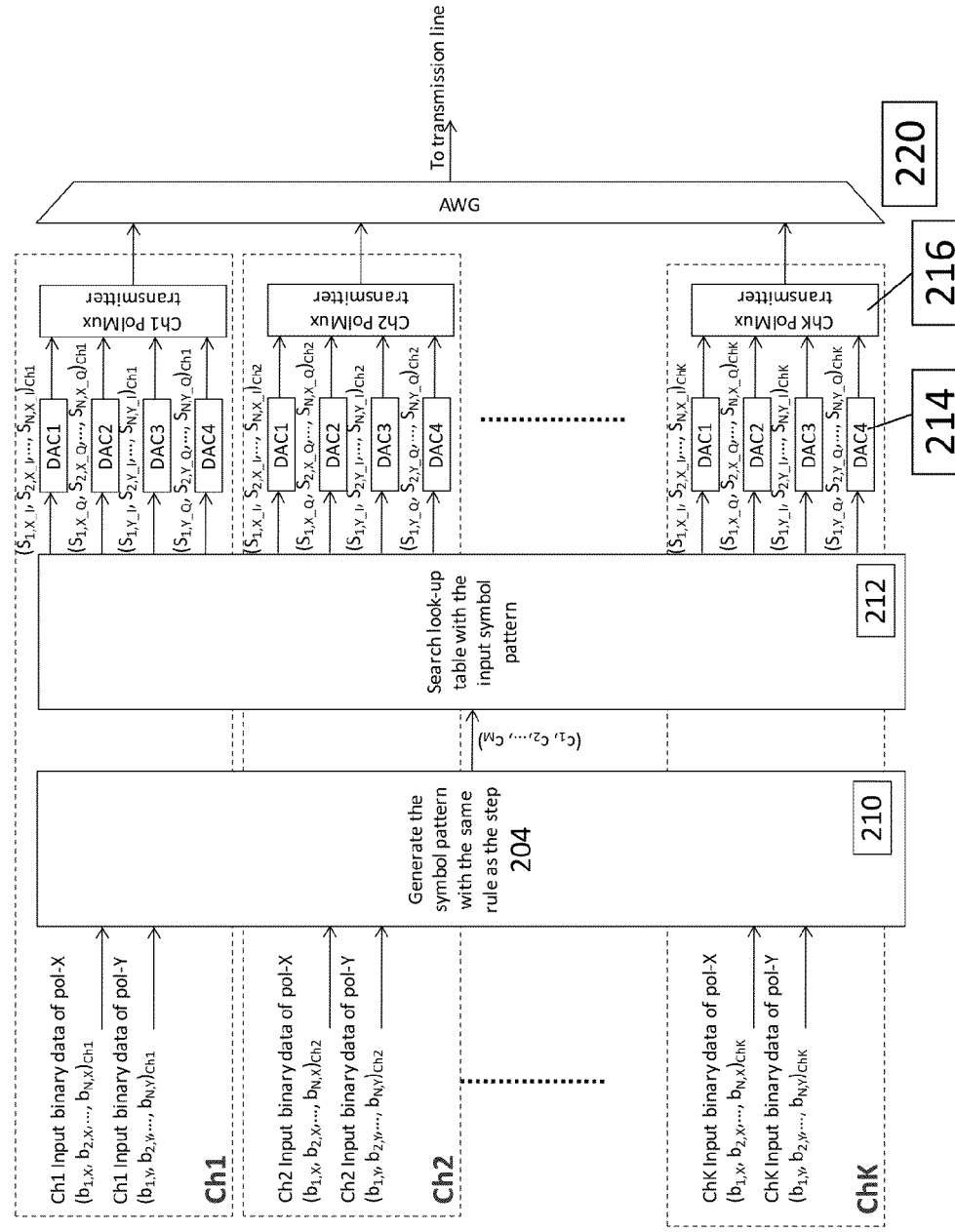
FIG. 5 shows an exemplary Polarization multiplexing (PolMux) digital transmitter (PDM) with look-up table based non-linearity compensation.

Turning now to FIG. 5, a PolMux digital transmitter (PDM) is shown with the look-up table based non-linearity compensation. The input binary data of two polarizations (X,Y) from K channels are processed jointly with the symbol pattern generator (210) with the same re-organize and re-format rule as step (204) of FIG. 3 to generate a one dimension symbol pattern which can be read and searched within the look-up table. Then the input symbol pattern is searched in the look-up table and the corresponding output symbol pattern is located (212). The output symbols are then send to the DAC 214 to generate the analog I/Q signals which will be used to drive the I/Q modulators and the generate the optical PolMux transmit signals. The optical transmitters are sent to the transmission line through the AWG 220.

The system of FIG. 5 provides a digital transmitter solution with non-linearity compensation feature based on a look-up table instead of the real-time non-linearity compensation function conventionally done. Operations 210-212 need to be done in real-time. The system of FIG. 5 significantly reduces the implementation complexity by using look-up table searches instead of real-time processing of every signal. The non-linearity compensation feature would also improve the transmission performance to support a longer span length or total transmission distance, among others.

The digital transmitter can utilize the original error-free data symbols to do the compensation without the interferences from any noise and other linear dispersion caused by the transmission. In addition, because of the digital transmitter and availability of the original input data symbol patterns, a look-up table search becomes possible. The look-up table can be generated off-line previously for finite combinations which can cover all the possibilities of the input symbols patterns.

For a transmission system, the maximum dispersion length is determined first so that the compensation pattern length is fixed. The transmitter side non-linearity compensation is processed in a pattern/packet base and the pattern/packet length needs to be larger than the maximum dispersion length. After the pattern length is known, there would be a number of total different input signal patterns which is eventually the look-up table size. The look-up table needs to be previously calculated for all these input signal patterns and find the optimal output symbols for every single signal pattern. During the transmission, the digital transmitter will read the data inputs from multiple channels and generate a data pattern which can be matched/compared it to the look-up and find the corresponding optimal output symbols after the non-linearity compensation. The optimal symbols would be sent to the DAC, converted to analog signals and used to drive the modulator. The look-up table search processing can be done parallel which can fully utilize the hardware resources in an FPGA or ASIC chip.

Figure 6:
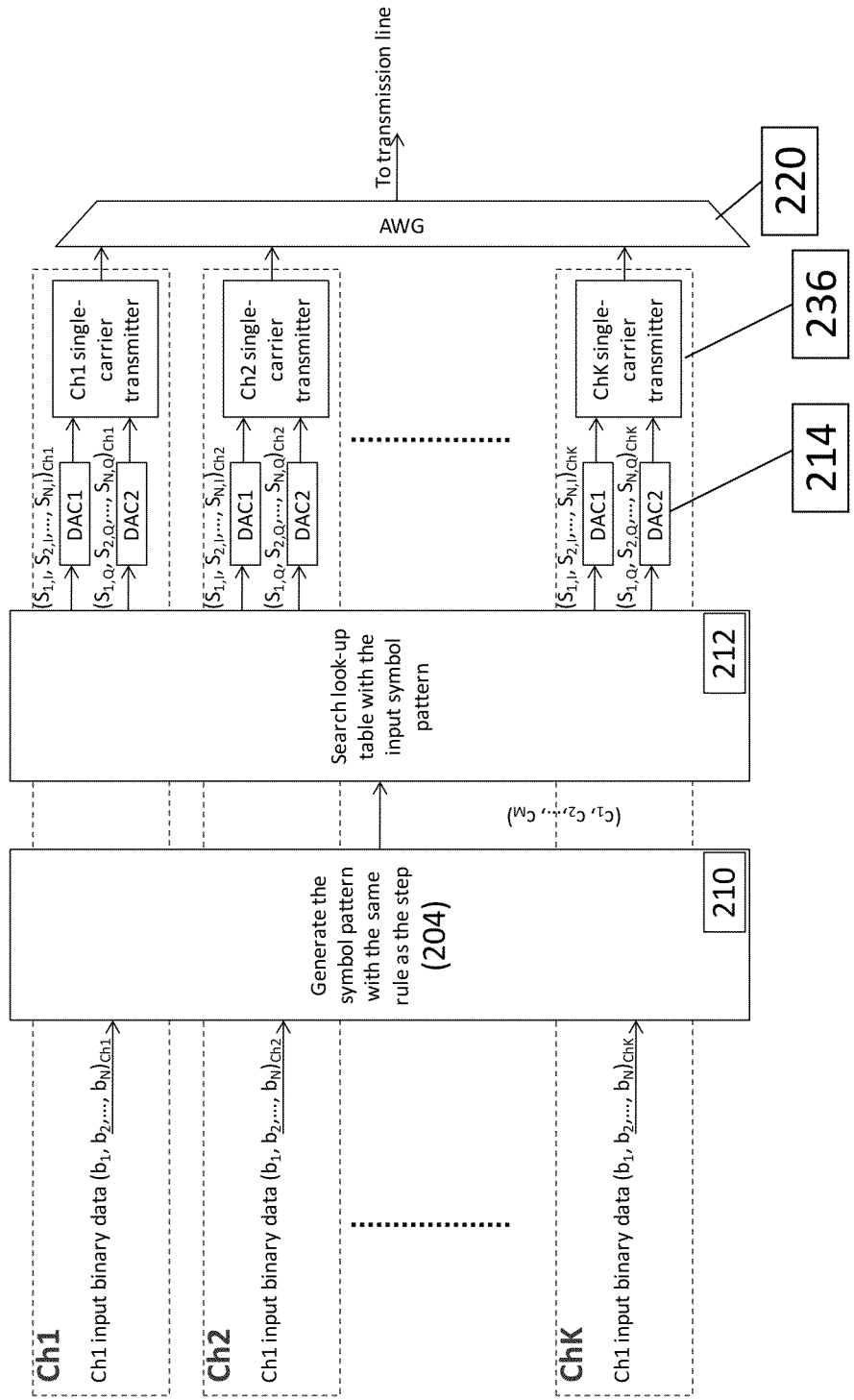
FIG. 6 shows an exemplary single polarization digital transmitter with look-up table based non-linearity compensation.

FIG. 6 shows an exemplary single polarization digital transmitter with look-up table based non-linearity compensation. In FIG. 6, the input binary data of two polarizations (X,Y) from K channels are processed jointly with the symbol pattern generator (210) with the same re-organize and re-format rule as step (204) of FIG. 3 to generate a one dimension symbol pattern which can be read and searched within the look-up table. Then the input symbol pattern is searched in the look-up table and the corresponding output symbol pattern is located (212). The output symbols are then send to the DAC 214 to generate the analog I/Q signals which will be used to drive the I/Q modulators and generate single carrier optical transmit signals (236). The optical transmitters are sent to the transmission line through the AWG 220.

In FIG. 6, a digital transmitter can utilize the original error-free data symbols to do the compensation without the interferences from any noise and other linear dispersion caused by the transmission. In addition, because of the digital transmitter and availability of the original input data symbol patterns, a look-up table search becomes possible. The look-up table can be generated off-line previously for finite combinations which can cover all the possibilities of the input symbols patterns.

An exemplary implementation is discussed next. For a PDM-QPSK 40G transmission (12.5 GHz baud rate, 80 ps/symbol) with 80 km span and DCF, the maximum Chromatic dispersion is 17 ps/km/nm*0.1 nm*80 km=136 ps which is about two symbols duration. The transmitter side non-linearity compensation will be processed in a packet base and the packet length needs to be larger than the maximum dispersion length which is 2 symbols in this example. Assuming the packet length is 5 symbols, the number of bits for those 5 symbols is 5*2*2 or 20 (considering the 2 bits/symbol QPSK and polarization multiplexing.) For this example, there are approximately $2^{20}=1048576$ different input signal patterns. The look-up table needs to be determined in advance for all 1048576 input signal patterns and optimal output symbols are determined for every single signal pattern. During transmission, the digital transmitter will read the input data pattern, match/compare it to the look-up and find the corresponding optimal output symbols after the non-linearity compensation. The optimal symbols would be sent to the DAC, converted to analog signals and used to drive the modulator. The look-up table search processing can be done parallel which can fully utilize the hardware resources in a FPGA or ASIC chip.

Figure 7:
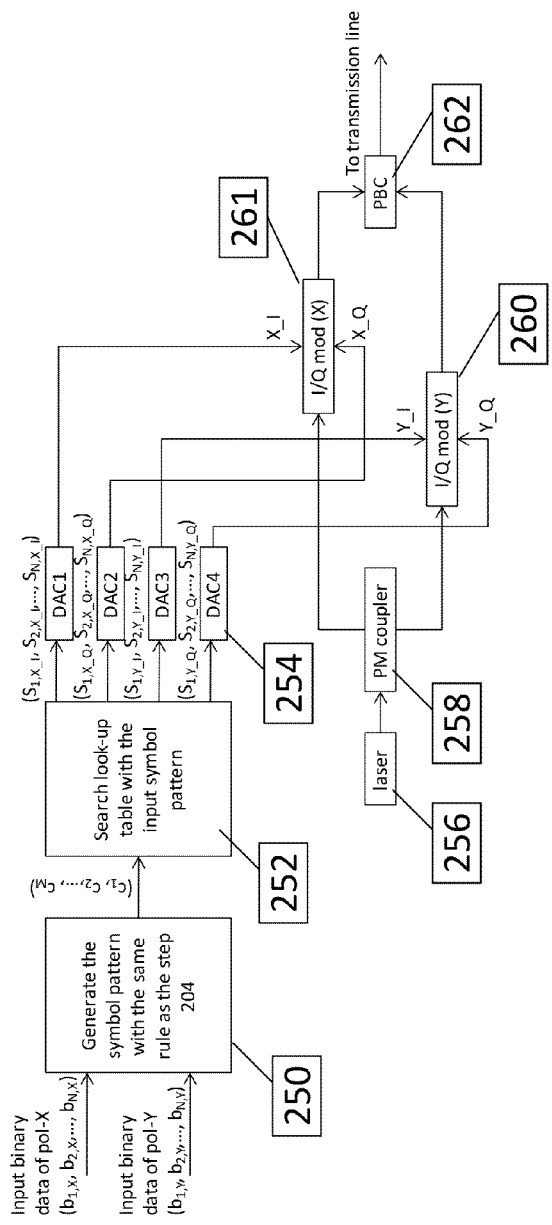
FIG. 7 shows another exemplary PolMux (PDM) digital transmitter with look-up table based non-linearity compensation

FIG. 7 shows another exemplary PolMux (PDM) digital transmitter with look-up table based non-linearity compensation. In FIG. 7, a symbol pattern generator module 250 is used to generate the symbol pattern. The pattern is stored as a look-up table 252. The look-up table 252 is used to provide the appropriate symbol pattern to an array of digital to analog converters 254, and the DACs 254 drive a corresponding I/Q modulators 260. A laser 256 drives a PM coupler 258, which in turn controls the I/Q modulator 260s. The outputs of the IQ modulators 260 are provided to a PBC.

During operation, the PolMux digital transmitter applies the look-up table based non-linearity compensation. The input binary data of two polarizations (X,Y) are processed with the symbol pattern generator 250 with the same re-organize and re-format rule as operation 204 (FIG. 3) to generate a one dimension symbol pattern which can be read and searched within the look-up table. Then the input symbol pattern is searched in the look-up table and the corresponding output symbol pattern is located. The output symbols are then send to the DAC to generate the analog I/Q signals which will be used to drive the I/Q modulators and the generate the optical transmit signals. Similar architecture can be found in FIG. 6 for single polarization transmitters.

Figure 8:
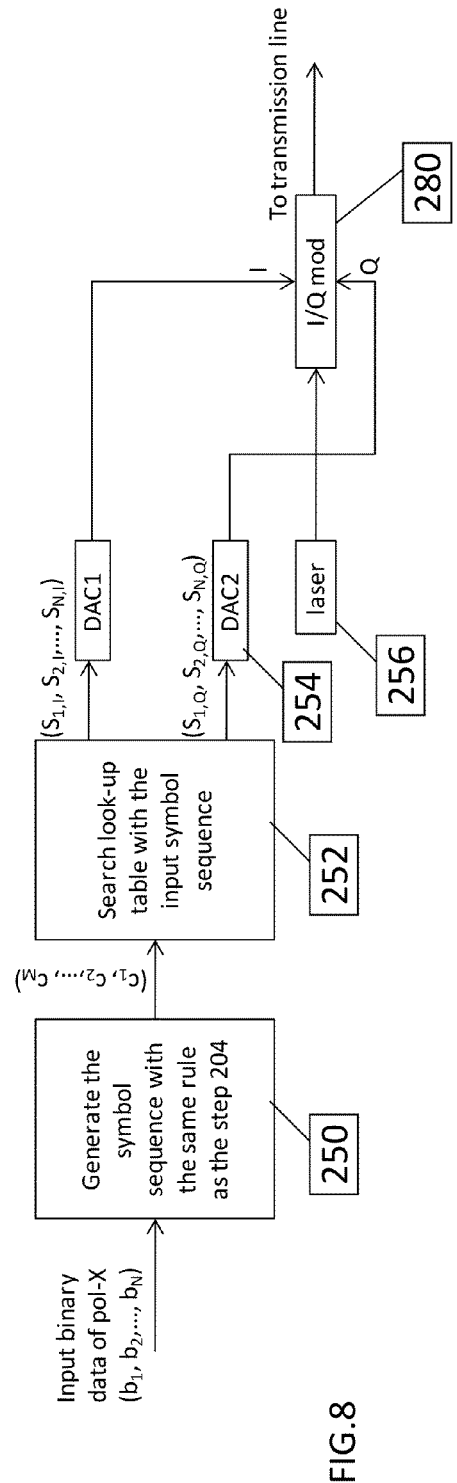
FIG. 8 shows an exemplary single polarization digital transmitter with look-up table based non-linearity compensation.

FIG. 8 shows an exemplary single polarization digital transmitter with look-up table based non-linearity compensation. In FIG. 8, the symbol pattern generator module 250 is used to generate the symbol pattern. The pattern is stored in the look-up table 252. The look-up table 252 is used to provide the appropriate symbol pattern to an array of digital to analog converters 254, and the DACs 254 drive an I/Q modulator 260. A laser 256 drives the I/Q modulator 260 whose output is provided to the transmission line.

Figure 9:
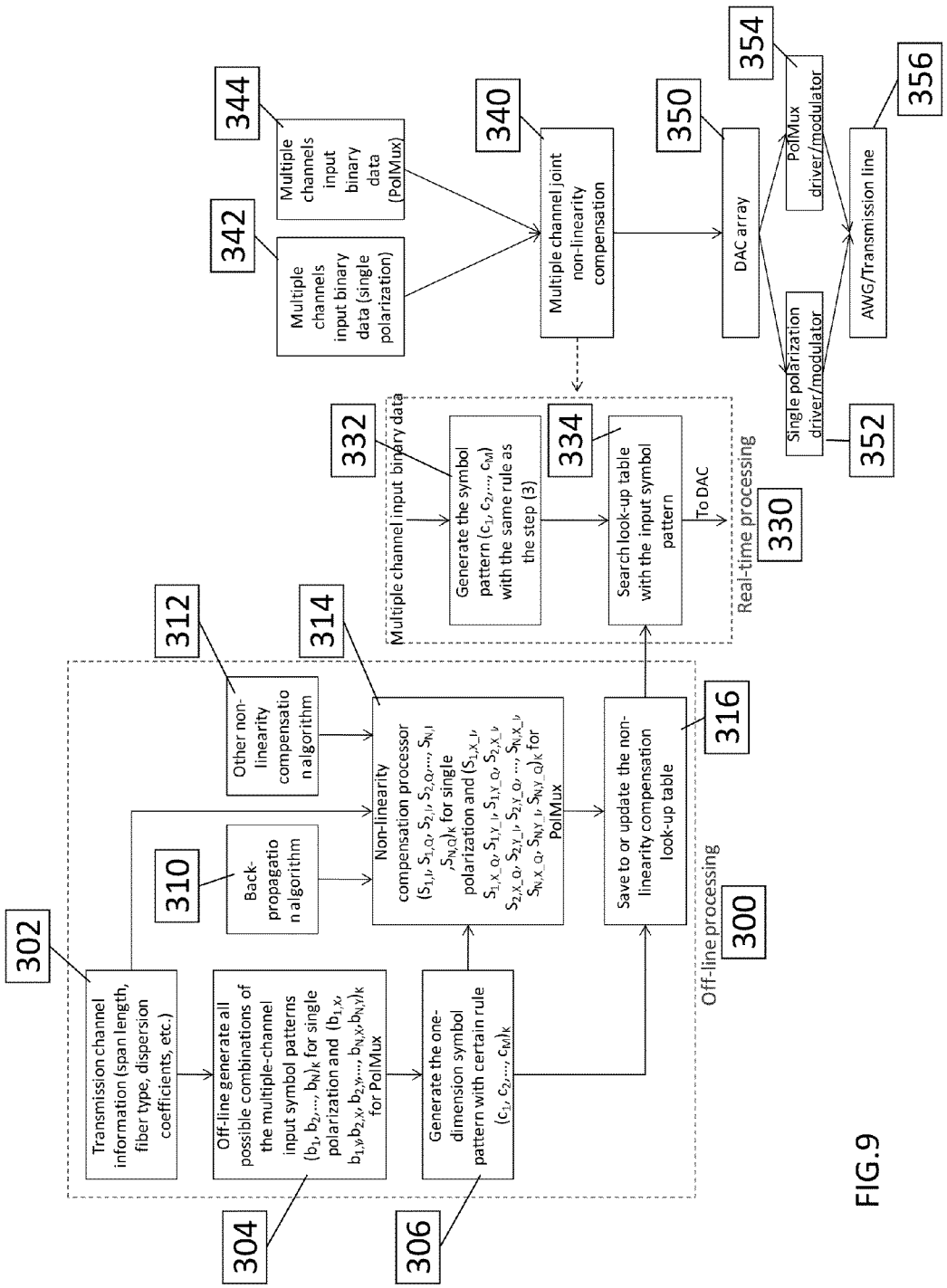
FIG. 9 shows an exemplary system to perform non-linearity compensation with the look-up table.

FIG. 9 shows an exemplary process to enhance the optical transmission of data with the look-up table approach. The system of FIG. 9 moves the computationally intensive processing done by a non-linearity compensation processor 314 to an off-line processing operation so that subsequent computing complexity can be avoided. A look-up table 316 then stores the off-line processing results. For the digital transmitter, the non-linearity compensation is simplified to the look-up table search operations 332-334 instead of complicated digital signal processing. The look-up table search is much easier to be implemented and is highly parallelizable. The process of FIG. 9 has an off-line processing module 300 and a real-time processing module 330 that receives data from hardware and outputs Turning now to FIG. 9, transmission channel information such span length, fiber type, and dispersion coefficients, among others, is captured by block 302. The process generates combinations of multiple-channel input symbol patterns for a single polarization and PolMux coefficients in block 304. Next, one dimensional symbol patterns are generated using predetermined rules in block 306. The pattern is provided to a non-linearity compensation processor 314. The processor has access to programmatic details of the back propagation method in block 310 or other non-linearity compensation methods to select from block 312. The processed output is saved to a non-linearity compensation look-up table 316, or is used to update the look-up table 316.

Turning now to the real-time processing module 330, multiple channel input binary data is applied by block 332 to generate the symbol pattern using the predetermined rule used in block 306. Next, the process searches the look-up table with the input symbol pattern in block 334. The result of the table look-up is provided to a DAC.

The real-time processing module 330 also receives data from a multiple channel joint non-linearity compensation block 340. The multiple channel joint non-linearity compensation block 340 receives multiple channel input binary data 342 for single polarization and multiple channel input binary data 344 for PolMux. The output of the non-linearity compensation block 340 is provided to a DAC array 350 that drives a single polarization driver/modulator 352 and a PolMux driver/modulator 354. The outputs of modulators 352 and 354 are provided to the AWG and the transmission line 356.

In the foregoing embodiments, the non-linearity compensation processing is done in off-line mode and independent from any specific algorithm. Further, although the preferred embodiment uses the back-propagation method, the system can easily use or be updated to any other algorithms available for the compensation. When other algorithms become available in the future, only the look-up table needs to be updated to change to the new algorithm without any hardware changes at the transmitter side. Further, as the preferred embodiment is implemented at the transmitter side, it can completely compatible with any receiver solutions.

What is claimed is:

1. A method to process an optical signal, comprising:
generating a symbol pattern in accordance with predetermined rules;
pre-processing the symbol pattern with non-linearity compensation to fill a look-up table in an off-line mode;
applying said predetermined rules to single channel input data for self-phase modulation (SPM) compensation or multiple channel input data for cross-phase modulation (XPM) compensation to generate a real-time symbol pattern;
searching the look-up table with the real-time symbol pattern to determine a non-linearity compensation output;
comparing one or more input symbol patterns with the look-up table to find corresponding optimal output symbols, wherein the optimal output symbols are sent to a digital-to-analog converter (DAC) array, converted to analog signals; and
modulating the optical signal with the compensation output and the analog signals.

2. The method of claim 1, wherein generating the look-up table comprises:
determining a plurality of combinations of input symbol sequences from multiple channels; and
performing non-linearity processing on the symbol pattern and storing the symbol pattern in the look-up table.

3. The method of claim 1, wherein the non-linearity compensation comprises back-propagation.

4. The method of claim 1, wherein the input symbol patterns indicate modulation format and transmitter architecture.

5. The method of claim 1, wherein the input symbol patterns include single polarization or polarization multiplexing (PolMux) patterns.

6. The method of claim 1, comprising reorganizing the input symbol patterns to generate a one dimensional symbol pattern searchable in the look-up table.

7. The method of claim 6, comprising performing non-linearity compensation on the input symbol patterns and saving results in the look-up table.

8. The method of claim 7, comprising performing non-linearity compensation at a digital transmitter side to ensure availability of error-free original data for processing and search the look-up table.

9. The method of claim 1, wherein the symbol pattern comprises a one-dimensional symbol pattern or a multi-dimensional symbol pattern.

10. An apparatus to process an optical signal, comprising:
a pre-processing module to populate a non-linearity compensation look-up table based on a set of predetermined rules in a non-real-time off-line mode;
a comparison module configured to compare one or more input symbol patterns with the look-up table to find corresponding optimal output symbols, wherein the optimal output symbols are sent to a digital-to-analog converter (DAC) array, converted to analog signals; and
a transmitter applying said predetermined rules in real-time to multiple channel input data to generate a real-time symbol pattern, searching the look-up table with the real-time symbol pattern to determine a non-linearity compensation output, and modulating the optical signal with the compensation output and the analog signals.

11. The apparatus of claim 10, wherein the transmitter comprises a single polarization transmitter.

12. The apparatus of claim 11, wherein the transmitter comprises a PolMux transmitter.

13. The apparatus of claim 10, comprising an array of in-phase/quadrature (IQ) modulators coupled to the DAC array.

14. The apparatus of claim 13, comprising:
a laser; and
a PM coupler provide CW light source to the I/Q modulators.

15. The apparatus of claim 10, wherein the look-up table is generated by determining a plurality of combination of input symbol sequences from multiple channels and performing non-linearity processing on the symbol pattern and storing the symbol pattern in the look-up table.

16. The apparatus of claim 10, wherein the non-linearity compensation comprises back-propagation.

17. The apparatus of claim 10, wherein the input symbol patterns relate to a modulation format and a transmitter architecture.

18. The apparatus of claim 10, wherein the input symbol patterns include single polarization or polarization multiplexing (PolMux) patterns.

19. The method of claim 1, comprising performing two-times up-sampling of the optical signal by repeating the optical signal twice.

20. The apparatus of claim 10, comprising an analog to digital converter (ADC) to perform two-times up-sampling of the optical signal by repeating the optical signal twice.

* * * * *